Figure 4:
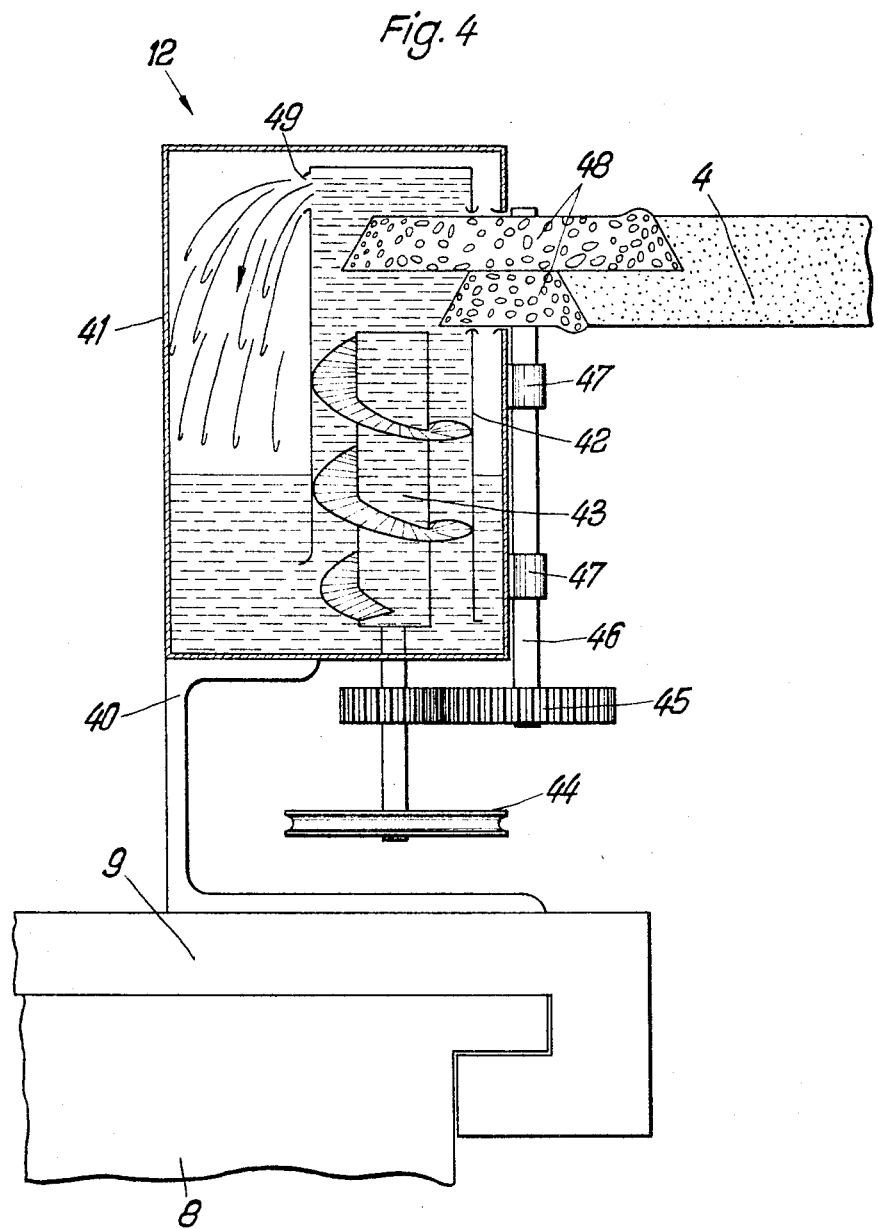

Aug. 23, 1966   K. FISCHER   3,268,383
APPARATUS FOR PRODUCING CONTINUOUS CHIPBOARD SHEETS OR PANELS
Filed Oct. 9, 1964   4 Sheets-Sheet 1
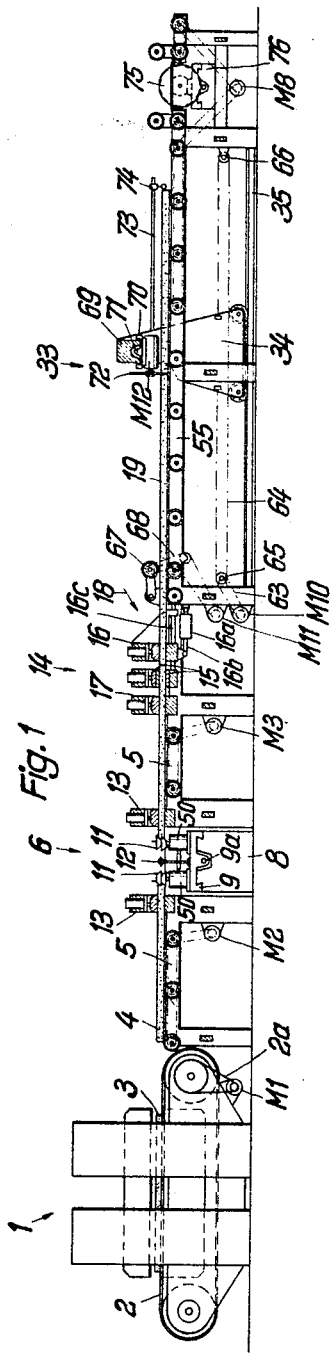
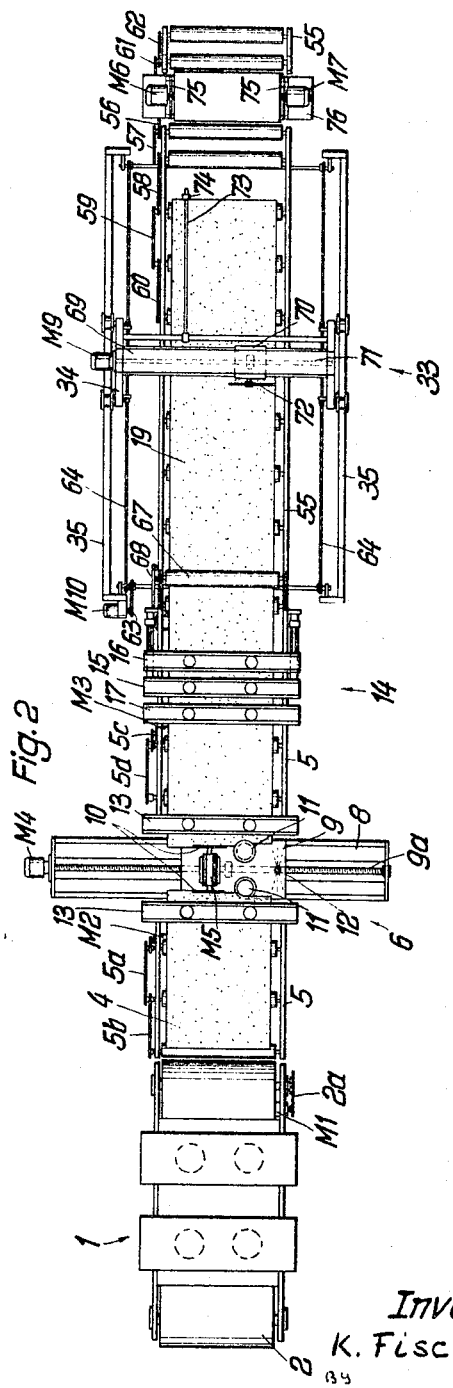
Inventor:
K. Fischer
By Richards & Geier
ATTORNEYS

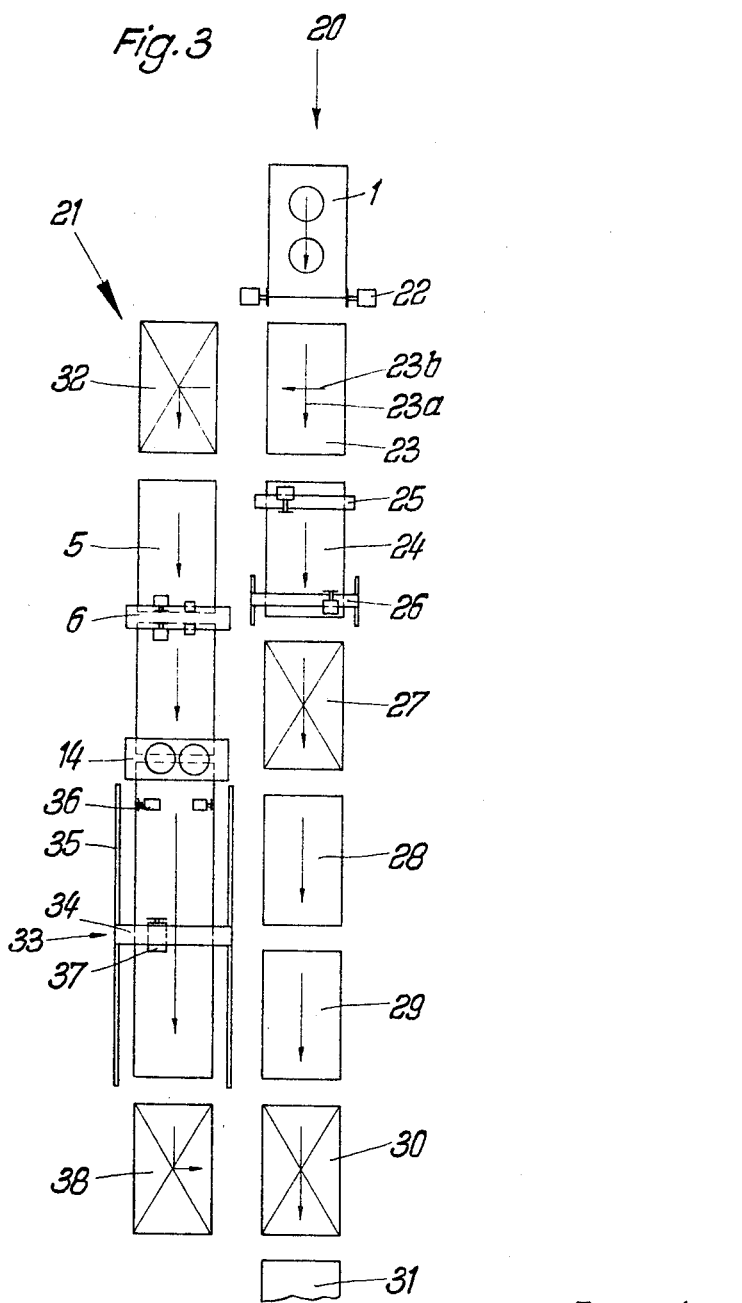

Aug. 23, 1966  K. FISCHER  3,268,383
APPARATUS FOR PRODUCING CONTINUOUS CHIPBOARD SHEETS OR PANELS
Filed Oct. 9, 1964  4 Sheets-Sheet 4
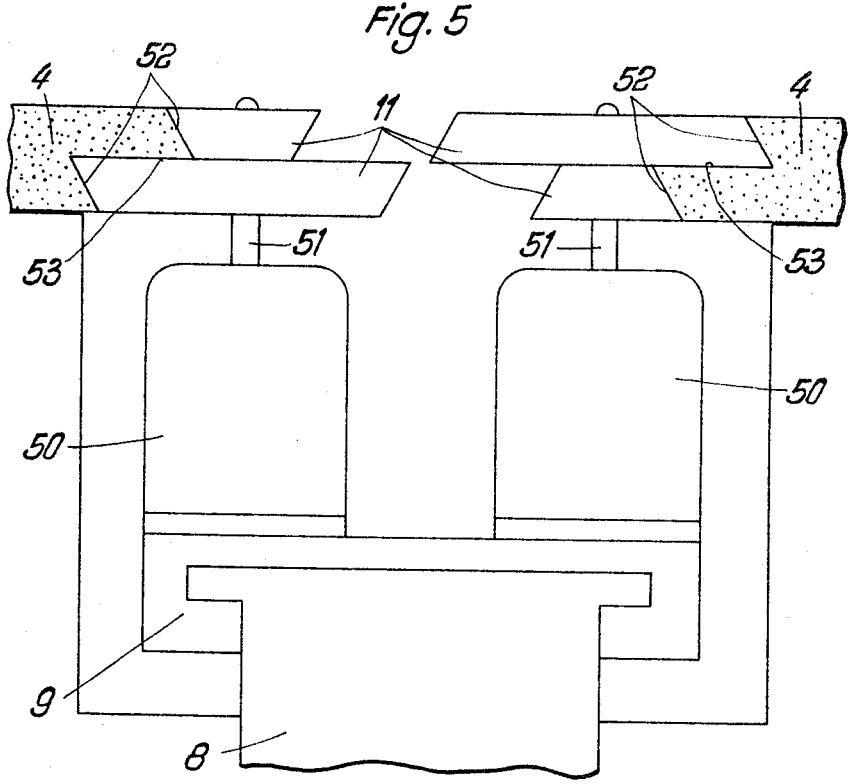
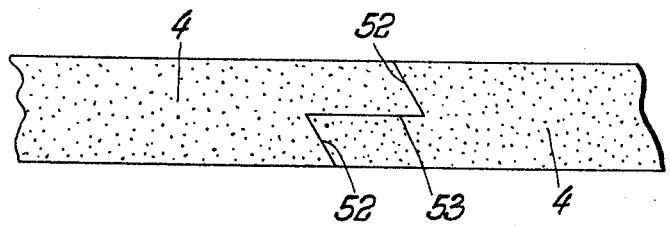
Inventor:
K. Fischer
By
Richards & Geier
ATTORNEYS

3,268,383
APPARATUS FOR PRODUCING CONTINUOUS CHIPBOARD SHEETS OR PANELS
Kurt Fischer, Bad Munder, Germany, assignor to Firma Bahre Metallwerk K.G., a corporation of Germany
Filed Oct. 9, 1964, Ser. No. 402,784
Claims priority, application Germany, Oct. 10, 1963, M 46,150; July 26, 1964, B 77,418
4 Claims. (Cl. 156—558)

The present invention relates to apparatus for producing chipboard in the form of a continuous strip of equal width, which may be divided up into sheets or panels of any desired length.

A chipboard factory plant must produce chipboard sheets whose quality, stability, shape and price correspond to the ideas of the customers.

Quality and stability must generally be invariable, while the desired shapes vary from one another within determined limits. Lower production costs are always demanded.

In apparatus for producing high-grade boards, flat presses are used, preferably intermittently operating. If boards of different shapes are to be produced, the largest desired board shape is based on the size of the devices for splitting up the mats, the power press, its plates and the remaining devices apart from the power press. The power press therefore always supplies only products of a pre-determined size. For producing small board sizes, the large boards must be divided up by means of a guillotine or other cutting devices such as saws. The remaining parts of the boards are relegated to secondary purposes and count as waste. This waste may constitute up to 30% of the production in unfavorable circumstances. The splitting up of the joined boards into unfavourable board shapes with much waste of timber leads to high production costs and reduces the productiveness of the apparatus. On the other hand, a chipboard apparatus, whose operation is limited to the production of boards of a size whose production is technically favourable without any waste of timber which is worth mentioning, may satisfy only one part of the demand of trade and machine industry.

Methods and apparatus are already known, which serve to produce chipboard in the form of a continuous strip, which is divided up into any length without waste of timber.

An apparatus of this type has an extruding means which ejects a continuous board strip. Chipboard produced in this way, may, however, only be used when the surface properties and bending strength required are not of a very high order.

In another known apparatus, an intermittently operating flat press is placed in position, to which a continuous mat of wood chips is conveyed at a steady rate, which leaves the power press on the other side as a continuous chipboard sheet or panel. Although precautions are taken against the mat being torn away at the rear edge of the plate of the power press at the beginning of the hot-pressing operation, the chips are moved to these boundary or junction points so that the continuous sheet has transverse portions, separated by the length of the power press of lower stability.

However, so far it has not been possible to produce an apparatus for producing constantly high-grade chipboard in the form of a continuous strip.

All proposed and known solutions are imperfect. They lead to boards of low quality, having, at the areas on which the front and back edges of the press operated, different properties from and a lower stability than the remaining areas of the board.

It is thus the object of the invention to produce chipboard of high quality in continuous form.

The invention consists in an apparatus for producing continuous chipboard sheets or panels, wherein a pair of tools is associated with an intermittently operable press at a distance of at least the length of the press itself, said pair of tools being movable across the longitudinal direction of each board for cutting in pairs, together with the means also movable across said direction for gluing in pairs, each of two opposed board edges, and a second intermittently-operable press for joining and pressing the same either at the working place of the pair of tools or behind the same at the distance of a board length. The drive of the pair of tools and of the gluing means as well as the closing times of the two power presses may be synchronized to the working cycle of the heating press.

If desired, means may be arranged between the heating press and the apparatus for cross cutting, gluing and pressing the board edges, for stacking the formed boards ejected from the heating press.

Advantageously the hot press apparatus for cross cutting, gluing and pressing the board edges are arranged in a secondary production line, which is arranged adjacent a main production line for producing boards of uniform size, so that the formed boards from the heating press may be made continuous if desired, or merely trimmed. A distributing device is suitably arranged on the heating press, preferably a table with driven rollers with a cross conveyor for selective loading of the main and secondary production lines. A further feature consists in that the secondary production has, besides the devices for cross cutting, gluing and pressing the board edges a guillotine or other cutting device such as a saw with movable longitudinal and cross saws and a stacking device at the end, a device for delivering the boards on to the main production line, for the general further treatment of said boards with the boards of uniform size.

Preferably, the cutting tools and the gluing device are provided on a slide or, if desired, divided on two alternately operating slides and arranged at the same distance from the power press. As cutting tools there may be used a pair of edge saws or a pair of cutters producing interlockable profiles, said cutters being located after the edge saws. A preferred cutter arrangement comprises a pair of cutters producing a profile and a counter-profile, and having two similar cutter sets of which one is pointed inversely on the cutting spindle and said arrangement produces preferably profiles for interleaving together with sloping rails.

The gluing device may have two gluing nozzles spraying in opposite directions. In a particularly advantageous arrangement, the gluing device has at least one glut container with an upright stand pipe for gluing the board edges together, the lower opening of the stand pipe being located closely above the base of the container, the lower wall of which surrounds a vertically arranged screw conveyor having an upper overflow opening out into the interior of the container, and laterally on the container wall, a vertical, driven shaft, located on the wall or on the slides, and carrying thereabove a gluing roller, the arrangement being such that one part of the gluing roller passes through the container wall and the upper part of the stand pipe.

In a modification, the gluing device includes a glue container having an opening for the glue rollers, which corresponds to the roller profile and also forms a seal above and below with the roller faces. The profile of the glue rollers corresponds outwardly to the cutting profile. If desired, the gluing device may have a glue container with two glue rollers, arranged on opposite sides of the container wall and passed as required into the interior of the container and of the stand pipe.

Apparatus according to the invention overcomes a general prejudice, and particularly the prejudice of the man skilled in the art to a method of production which employs "joining." A solution has successfully been found which is considerably different from the previously suggested unsuccessful methods.

In accordance with the invention, devices are arranged on an intermittently-operable flat press which join boards, supplied individually and at a steady rate from the heating press, to form a continuous strip which is subsequently subdivided into boards of any desired length by guillotine or saws without waste of timber.

The length of the heating press of a chipboard apparatus is chosen in dependence upon the format of the boards most frequently ordered by the customers. For boards of this particular format no further subdivision is necessary There is no waste of timber so that it is appropriate to maintain the customary further treatment for these boards after their leaving the heating press. According to the invention, the means for effecting the continuous joining are therefore arranged in or on a secondary production line to which line the boards leaving the heating press are conveyed, if boards are required having a size different from the uniform format available on the main production line. In the secondary production line, the boards are cut, glued and pressed together by their edges and subdivided into the desired secondary format. Subsequently they are conveyed, according to the invention, again to the main production line for further treatment. A chipboard plant with an apparatus according to the invention is therefore in the position to manufacture economically any boards of secondary format of this type besides boards of uniform size.

The most appropriate arrangement of the joining devices in chipboard apparatus of conventional type depends upon the frequency of the secondary sizes compared with the uniform size and upon the number of the desired secondary sizes. If the desired sizes fluctuate strongly and no one particular size is preferred as a uniform size and is produced correspondingly frequently, it is suitable to arrange the devices for cutting, gluing and pressing the edges of the boards coming from the heating press within the main production line.

The success of an apparatus according to the invention depends essentially upon the joining technique used, which is explained in detail hereinafter.

Chipboards or the like glued flushly together, the joint of which is located in a very narrow strip of the board have the disadvantage, that another transverse strain coefficient occurs at the boundaries between the individual boards. Thus, strips clearly stand out on the surface of boards of this type when they are veneered. On the other hand, the devices of an apparatus according to the invention join the boards in such a way that the boundaries between individual boards either appear where the surface is veneered or have properties varying from the other areas of the board. The boundaries between individual boards of the completed strip-form board must be inspected with the eye either on the surface or on the edge after the cutting and trimming of the board units. By means of a wide overlapping or interleaving of the edges of the boards the rails or projecting parts are widely separated. These rails are obliquely applied. Thereby the joint and the influence over the transverse strain coefficient is split up into many sections in the wide area of the boundary, and thus only indiscernible differences of expansion occur. By means of the oblique rails the stability is at the same time supported in a positive manner. Two joined and glued board portions of this type do not break in the area of the joint during a transverse-bending up to the breaking limit, since there, predominant higher values of rigidity occur. An expansion on the boundary between units is also fixed for the transverse strain stability.

As will be evident from the description to follow, the joint profile is moreover cut, glued and pressed to the finished form with devices according to the invention at low cost.

In order that the invention may be more clearly understood, reference will now be made to the accompanying drawings which show some embodiments thereof by way of example, and in which:

FIGURE 1 shows a side view of devices arranged to form a heating press for continually joining individual board portions within a production line, FIGURE 2 is a plan view of FIGURE 1, FIGURE 3 is a schematic plan view of a main production line with a secondary production line arranged parallel thereto with devices for continuous joining, FIGURE 4 is a side view of a gluing device partly in section, FIGURE 5 is a side view of a cutting device for cutting board edges in pairs, and FIGURE 6 is a partial view of two boards glued on their edges, a halved or overlapping or interleaved joint with oblique rails being selected as connecting means.

Referring to the drawings, to the left of FIGURE 1 is shown a heating press—generally shown at 1—in the embodiment a flat press with two plates or platens to which mats of wood chips 3 to be compressed under heat are fed successively at a steady rate on an endless band 2, driven by a motor M1 via a chain 2a. After the power press 1 has opened, each heated board portion 4 is moved on with the simultaneous feeding in of a new mat of chippings, on to a roller table 5 driven by motors M2 and M3 via chains 5a and 5b or 5c and 5d, and is carried thereon until the front edge of the board 4 has reached the area of a cutting and gluing device—generally shown as 6. Said latter has a support 8, which extends across the conveying direction, with a slide or carriage 9 driven by a motor M4 via a lead screw 9a. On said slide a pair of trimming saws 10 driven by means of a motor M5, a pair of cutters 11 driven by motors 50 and a gluing device 12 operating along two opposite sides, are located behind one another across the conveying direction. On both sides of the device 6, stamps 13 are arranged for stretching the adjacent ends of two successive boards 4 above the roller table 5. As soon as the stamps 13 engage a board 4 and the opposed end edges of both boards are held in an exactly assigned position opposite the device 6, the slide 9 is put into motion by automatic switching in of the motor M4. While said latter is guided along the support 8 between the board ends within said latter, a trimming saw 10, a cutter 11 and a glue coating device 12 are successively engaged with each end and operate on said latter. Both end edges are pre-trimmed, cut and glued after the slide 9 has completed its passage.

Behind the cutting and gluing device 6 is arranged at about the distance of the length of the power press a second heating press—generally shown at 14. The ready-glued boards 4 advance to the power press 14, until the pair of ends, operated on at the same time, are located beneath the heated press plates or platens 15. Press stamps 16 and 17 are lowered onto the ends of the boards 4 and effect at the same time a vertical and horizontal pressure (see arrow 18) on said ends, which are thereby moved into mutual contact. It will be apparent from FIGURE 1, that in the horizontal direction, the stamp 17 serves as a support, when the stamp 16 is moved under pressure on a guide bar 16c via a hydraulically operated cylinder 16a with a piston rod 16b. The heating plates 15 carry out under pressure the hardening of the joint. When the joining process has finished, a continuous chipboard sheet or strip 19 is, in the working cycle of the device, delivered from the power press 14 to be subdivided and for further treatment.

A device for this subdivision (guillotine or saws)—generally shown as 33—consists of a further roller table 55, the rollers of which are driven partially by a motor M8 via chains 56 to 63, and of a gantry-shaped frame 34, movable on rails 35 by means of chains 64 passing over chain wheels 65 and 66. The wheels 65 are driven via a chain 63 by a motor M10.

A pressure roller 67 is arranged above the roller table 55 and is driven by a motor M11 via a chain 68.

On a support 69 carried by the frame 34 is arranged a slide 70 movable by means of a lead screw 71 driven by a motor M9. Said slide holds a saw 72 driven by means of a motor M12. The cutting process of said saw is started by means of a switch 74 adjustably secured on a rod 73, whenever the said switch is engaged with the rear edge of the strip 19. The distance of the switch from the saw 72 determines the length of the finished boards.

The longitudinal trimming of the prepared section is carried out by the longitudinal edging saws 75 within the roller table 55, following the cross saw 72, said saws 75 being driven by motors M6 and M7 and being movable on a support 76.

FIGURES 1 and 2 show the devices 6, 14 and 33 for the continuous joining of the boards 4 and for subdivision in a single strip production line, so that all the boards 4 are joined together to the continuous strip 19 and chipboard sheets or panels of all sizes are produced by subdividing said strip.

For this method of production, the drive of the device 6 and the closing times of the power press 14 are synchronised to the working cycle of the power press 1.

On the other hand, FIGURE 3 shows an embodiment for an arrangement of the device 6, 14 for continuous joining in a secondary production line 21. A dividing device 23 behind the heating press 1 conveys the boards as desired to the main production line 20 (shown by arrow 23a) or by means of a cross conveyor (shown by arrow 23b) to the secondary production line 21. Pressed-out board portions which serve to produce chipboard panels of a uniform size and are essentially only trimmed and buffed, pass through the main production line 20 with the following successive stations:

Behind the power press 1, a pre-trimming saw 22 removes the unnecessary longitudinal edges of the boards 4, the dividing device or switch 23 hands over the board from the guillotine or saw 24 to a stationary and a longitudinally movable cross saw 25, 26. Finished boards are stacked by a lifting stacker 27 with a longitudinal conveyor and are transferred to the stacker on roller bearings 28, 29 and thence to the lifting stacker 30 feeding the successive treatment stations 31, for example devices for buffing or polishing.

Boards 4 for forming a continuous chipboard panel strip are branched, on the contrary, away from the main production line 20 by means of the cross conveyor 23, and are conveyed via a lifting stacker 32 to the devices 6 and 14 arranged within the secondary production line 21, which devices treat and glue, as hereinbefore described, the edges of the individual boards as well as join them securely together to form a continuous chipboard panel strip. The latter is subdivided into the desired secondary sizes by an associated guillotine saw 33 having a frame 34 movable on rail 35, which framework may carry not only longitudinal trimming saw 36 but also a cross saw 37. A lifting stacker 38 receives the cut boards and feeds the stacker by means of a cross conveyor to the lifting stacker 30 for further treatment of the plates in the main production line.

The described succession of the devices within both production lines may be seen as an exemplary embodiment of an apparatus according to the invention.

The principle of the invention may be varied frequently for almost any apparatus and may be adapted advantageously to any conditions.

Similarly, the special construction, the sequence and the arrangement of the devices for treating the edges of the boards, may be modified.

It may be advantageous, for example, to arrange the trimming saws 10 and cutters 11 together on one slide, and if the gluing device is separated therefrom, on a second slide. The selection of the cutting tools depends upon the preferred joint shapes.

Chipboard having edges with inclined rails or projecting parts which are flushly joined, have the advantage of dividing the joint into a plurality of vertical board parts. The bevel of the edges necessary for this purpose may be effected by a pair of inclined saws or a pair of cutters.

The type of connection shown in FIGURE 6 has proved itself favourable in the production and to be of high stability. Cutters 11 effect the appropriate profiling, said cutters being mounted on vertical spindles 51, driven by motors 50, and are prevented from twisting (cf. FIGURE 5). The cutter sets are both the same. One of the two sets is mounted inversely upside-down on the spindle 51, in order to produce respectively a profile and counter-profile. The cutters comprise discs with a simple sloping profile, the inclination of which is equal on each disc, so that the subsequent polishing causes no difficulties.

The sloping rails or projecting parts 52 of the said profile contribute essentially to the stability of the connection, since they hook the boards to be connected, into each and oppose positively any tendency to bend.

The gluing device 12 located after the cutting tools may have nozzles, from which the glue is sprayed against the cut edges of the boards.

Glue is coated by the device 12 shown in FIG. 4, namely, by means of glue rollers 48, which are pressed onto the cut surfaces 52, 53 and are then rolled along, having the same profile as the cutters. A constant circulation of glue is maintained by a glue container 41 by means of a vertical conveyor screw 43 within a stand-pipe 42 with an upper mouth 49 leading into the container, so that the glue is not prematurely hardened and may not be deposited on the parts conveying the glue. The glue roller fits tightly at its frontal edges, on the upper and lower edge of the lateral opening in the container 41 and stand-pipe 42, so that only the outer surfaces operate as glue carriers. A motor (not shown) drives the conveyor screw 43 via a wheel 44 and also a vertical shaft 46 via a toothed-wheel drive or pulley drive 45, said vertical shaft 46 being located at 47 on the container wall or on the slide 9, and carrying the glue roller 48 thereabove.

The gluing in pairs of the cut edges of the two boards may be effected with two containers 41 each having at least one roller 48, or with a single container, on the opposite sides of which a plurality of rollers is arranged and moistened together.

I claim:

1. Apparatus for producing continuous chipboard sheets and panels, said apparatus comprising, in combination, an intermittently operable press for pressing boards, means driving said press, a pair of cutting tools located at a distance from said press which is at least equal to the length of the press, a gluing device for applying glue to edges of boards, a second intermittently operable heating press, means moving boards pressed by the first-mentioned press to said tools and said gluing device with edges of two boards being located opposite each other and adjacent said tools and said gluing device, means moving said tools and said gluing device transversely to the direction of movement of said boards for cutting said opposed edges and applying glue thereto, means moving the boards to the second-mentioned press while bringing the cut and glued opposed edges of the boards in engagement with each other, and means operable in synchronism with the first-mentioned means and the third-mentioned means for driving the second-mentioned press to firmly interconnect the cut and glued inter-engaging edges of the boards.

2. An apparatus in accordance with claim 1, further comprising a board stacking device for stacking boards pressed by the first-mentioned press and a cross conveyor connected with the second-mentioned means for selectively moving the boards pressed by the first-mentioned press either to said tools and said gluing device or to said stacking device.

3. An apparatus in accordance with claim 2, further comprising a board trimming device for trimming the boards pressed by the first-mentioned press, said board trimming device and said board stacking device constituting a main production line for producing plates of uniform size, said cutting tools, said gluing device and the second-mentioned press being located adjacent to said board trimming device and said board stacking device and constituting a secondary production line for producing continuous plates.

4. An apparatus in accordance with claim 3, wherein said secondary production line further comprises a guillotine saw for cutting the board formed by the second-mentioned press into board sections, and a stacking device feeding the last-mentioned board sections to the first-mentioned stacking device.

References Cited by the Examiner
UNITED STATES PATENTS

| | | | |
|---|---|---|---|
| 1,795,953 | 3/1931 | Johnson | 144—90 |
| 2,516,280 | 7/1950 | Welch | 156—546 |
| 2,989,774 | 6/1961 | Erickson et al. | 18—4 |
| 3,003,541 | 10/1961 | Prentice et al. | 156—263 |
| 3,057,022 | 10/1962 | Bon et al. | 19—155 |

EARL M. BERGERT, *Primary Examiner.*

M. KATZ, *Assistant Examiner.*